United States Patent Office 3,258,477
Patented June 28, 1966

---

3,258,477
ACRYLOXYALKYLSILANES AND COMPOSITIONS THEREOF
Edwin P. Plueddemann and Harold A. Clark, Midland, Mich., assignors to Dow Corning Corporation, Midland, Mich., a corporation of Michigan
No Drawing. Filed Feb. 3, 1964, Ser. No. 342,220
10 Claims. (Cl. 260—448.8)

This application is a continuation-in-part of applicants' abandoned application Serial Number 296,375, filed July 19, 1963, which in turn is a continuation-in-part of their abandoned application Serial Number 111,146, filed May 19, 1961, which in turn is a continuation-in-part of their abandoned application Serial Number 87,101, filed February 6, 1961. Said abandoned application Serial Number 296,375 is also a continuation-in-part of applicants' copending application Serial Number 288,525, filed June 17, 1963, which in turn is a continuation-in-part of their aforementioned abandoned application Serial Number 111,146.

This invention relates to certain silanes characterized by a trifunctional silicon atom at one end of the molecule and an acryloxy group on the other end of the molecule and to aqueous solutions formed therefrom.

It is the primary object of this invention to provide novel compositions of matter which impart superior strength to molded articles, both organic and inorganic, and particularly those made from resins containing aliphatic unsaturation and siliceous base members and those made from concrete. Other objects and advantages will be apparent from the following description.

The silanes of this invention have the general formula $CH_2=CROO-R'_a-R''-SiX_3$ in which R is a methyl radical or a hydrogen atom; R' is a divalent group composed of carbon, hydrogen, and oxygen, the latter being in a configuration selected from the group consisting of ether linkages and hydroxyl groups, in R' the ratio of carbon atoms to oxygen atoms being not greater than 3 to 1 and R' being attached to both the COO and the R'' groups through CO linkages; $a$ has a value of 0 or 1; R'' is an alkylene radical of from 1 to 4 carbon atoms and X is a monovalent hydrolyzable group.

For the purpose of this invention R can be either hydrogen or a methyl radical, thus it is obvious that the term "acryloxy" as employed herein includes "methacryloxy" compounds.

The silanes of this invention are of two types; namely, those of the formula $CH_2=CRCOOR''SiX_3$ and those of the formula $CH_2=CRCOOR'-R''-SiX_3$. It is believed that the beneficial characteristics of the silanes of this invention reside in the acryloxy group at one end and the trifunctional silicon atom at the other. Thus, the purpose of R and R'' is to provide stable bridges connecting the acryloxy group to the silicon atom.

For the purpose of this invention R'' is any alkylene radical of from 1 to 4 carbon atoms such as methylene, ethylene, propylene, butylene and isobutylene.

For the purpose of this invention R' is an oxygenated radical in which the carbon to oxygen ratio is not greater than 3 to 1. This is for the purpose of maintaining the water solubility of the silane hydrolyzates as will hereinafter be discussed. Thus, it can be seen that R' can be an ether radical such as $(-CH_2CH_2O-)$, $(-CH_2CH_2O-)_{50}$, $[(-CH_2CH_2O-)_{40}(-C_4H_8O-)_{10}]$

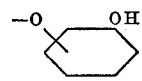

$(-CH_2CH_2OCH_2CHCH_2OCH_3CH_2O-)$, $(-CH_2CHCH_2O-)$

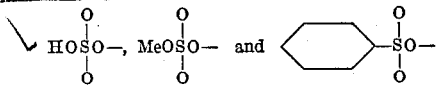

For the purpose of this invention X can be any monovalent hydrolyzable group. The term "hydrolyzable group" as employed herein means that the X group reacts with water under the normal conditions for hydrolyzing silanes. Thus X can be, for example, any halogen such as chlorine, bromine, iodine or fluorine, any group containing a silicon nitrogen bond such as $Me_2N-$, or $Et_2N$; any monovalent hydrocarbonoxy group such as methoxy, ethoxy, butoxy, isopropoxy, $-OCH_2CH_2OH$, or radicals of the formula $-(OCH_2CH_2O)_nY$ where Y is an aliphatic hydrocarbon radical of 1 to 4 carbon atoms, phenoxy, cresyloxy and

any acryloxy group such as acetoxy, formyloxy, propionoxy; groups containing the silicon-oxygen-nitrogen bond such as $Me_2C=NO-$ and $Et_2C=NO-$ and any sulphate group such as $HOSO_2O-$, $MeOSO_2O-$ and It should also be understood that hydrocarbon portions of X can be substituted with other radicals to give, for example, $CF_3CF_2O-$, $CF_3COO-$, $Me_2NCH_2CH_2O-$, $O_2N-$◯$-O-$ and $NCCH_2CH_2O-$.

This invention also relates to aqueous solutions of the hydrolyzates of the above silanes. Aqueous solutions of the hydrolyzates will often be the most commercially desirable form in which to use these products and the aqueous solutions are accordingly an important modification of the invention. The precise molecular configuration of the organosilicon compound in these aqueous solutions is not determinable. However, it is apparent that they represent highly hydroxylated silanols and siloxanols. When these aqueous solutions are prepared from silanes where the HX by-product is a neutral compound, the water solutions can be prepared by merely mixing the silane with water. However, in those cases where HX produces a strongly acidic or a strongly basic solution it is desirable to buffer the solution so as to bring the pH close to the neutral point. This will render the aqueous solution stable and hence more useable.

As stated above, one of the primary objects of this invention is to provide composite articles of improved strength. This strength is believed to be due to improved adhesion between the base member or filler and the vinylic resin. These articles can be prepared in two general ways. One way is to first treat the base member or filler with the above silanes or their hydrolysis products, cure the silane and thereafter apply the resin to the treated base member. An alternative method is to first add the silane to the vinylic resin and thereafter apply the mixture to the base member or filler.

The use of the compounds of this invention for this purpose is described in complete detail in the applications referred to above and in particular in application Serial Number 288,525, the disclosures of all of these applications being incorporated herein by reference.

The alkoxysilanes of this invention can be prepared by several basic methods. One of these involves compounds in which R'' has from 2 to 4 carbon atoms. This method involves the addition reaction of a compound of the formula

where $R''_1$ is an unsaturated radical such as vinyl, allyl, methallyl or butenyl, with $HSiX_3$. These addition reactions are best carried out in the presence of platinum catalyst such as platinum deposited on alumina and chloroplatinic acid. The reaction temperatures are in the region of 50 to 115° C. The platinum is best employed in a concentration of about $1 \times 10^{-4}$ moles per mole of unsaturated reactant.

Specific examples illustrating the above reactions are:

(1)
$$CH_2=CHCOOCH_2CH=CH_2 + HSiCl_3 \longrightarrow$$
$$CH_2=CHCOO(CH_2)_3SiCl_3$$

(2)
$$CH_2=C(Me)COOCH_2CH=CH_2 + HSi(OEt)_3 \longrightarrow$$
$$CH_2=C(Me)COO(CH_2)_3Si(OEt)_3$$

(3)
$$CH_2=C(Me)COO(CH_2CH_2O)_4CH_2CMe=CH_2 + HSi(OAc)_3 \longrightarrow$$
$$CH_2=C(Me)COO(CH_2CH_2O)_4CH_2CH(Me)CH_2Si(OAc)_3$$

(4)
$$CH_2=CHCOOCH=CH_2 + HSi(OCH_2CH_2OMe)_3 \longrightarrow$$
$$CH_2=CHCOOCH_2CH_2Si(OCH_2CH_2OMe)_3$$

The symbols Me, Et and Ac have been used above and will be used throughout this specification as representative of methyl, ethyl, and acetyl radicals respectively. If desired, one can carry out the addition reaction employing $HSiX_3$ and thereafter exchange the X radicals in the resulting silanes for other X radicals. Thus, for example, the chlorosilane shown above can be reacted with methanol to produce the corresponding trimethoxysilane. Alternatively, the chlorosilane can be reacted with the salt of an acid such as sodium acetate or sodium benzoate to prepare the corresponding triacetoxy or tribenzoyloxysilane. Again the triethoxysilane shown above can be refluxed with a high boiling alcohol such as beta-methoxyethanol to produce the tris-(beta-methoxyethoxy)silane. In such an interchange ethanol would be evolved.

A second general method of preparing the silanes of this invention is to first prepare an epoxysilane of the formula $$\overset{O}{\underset{}{\triangle}}$$
$$CH_2CHR''SiX_3$$

These compounds are prepared by reacting unsaturated epoxides of the formula $$\overset{O}{\underset{}{\triangle}}$$
$$CH_2CHR''_1$$

with silanes of the formula $HSiX_3$. In carrying out this reaction, of course, X must be a radical which is unreactive toward the epoxide group. This includes alkoxy and acyloxy silanes, in which the alkoxy and acyloxy groups are free of active hydrogen. The resulting addition product is then reacted with an hydroxy ester of acrylic or methacrylic acid such as, for example, beta-hydroxyethylmethacrylate. This reaction is carried out in the standard method for reacting alcohols with epoxides and is generally done by employing catalysts such as stannic chloride and temperatures in the range of 50 to 100° C. An illustrative reaction is as follows:

$$CH_2=C(Me)COOCH_2CH_2OH + \overset{O}{\underset{}{\triangle}}CH_2CHCH_2CH_2SiX_3 \longrightarrow$$
$$CH_2=C(Me)COOCH_2CH_2O CH_2\overset{OH}{\underset{|}{C}}HCH_2CH_2SiX_3$$

In carrying out any of the above reactions, it is desirable to employ polymerization inhibitors such as copper acetate and hydroquinone to prevent polymerization of the silane product by way of the acrylate double bond.

The third general method for preparing the compounds of this invention is especially applicable where R'' is a methylene radical. However, it can be used where R'' contains more than one carbon. This reaction entails reacting a tertiary amine salt of acrylic or methacrylic acid (the organic radicals attached directly to nitrogen in said salt being alkyl radicals of from 1 to 4 inclusive carbon atoms) with a chloroalkylsilane of the formula $$ClCH_2(CH_2)_xSi(X)_3$$

where X is an alkoxy or acyloxy radical and where $x$ is 0, 1, 2 or 3. It will be seen that the products of this invention wherein R'' is methylene will be produced when $x$ in the above reactant is 0. Triethylamine is the preferred amine to form the reactant salt, and the salt as such does not necessarily have to be isolated. In other words, the amine and the chosen acid can be merely mixed, and the chloroalkylsilane added to the mixture in approximately stoichiometric quantities. Preferably the reaction is carried out in the presence of an inert organic solvent such as benzene, toluene, xylene, or cyclohexane, at reaction temperatures of about 100° to 150° C. It is also best to carry out the reaction in the presence of one or more polymerization inhibitors for acrylic or methacrylic acid, such as hydroquinone and N,N'-diphenylphenylene diamine. The reaction proceeds with the formation of the desired product $CH_2=CRCOO(R')_a-R''-Si(X)_3$ and the precipitation of the by-products tertiary amine hydrochloride. The chloroalkylsilane reactants can be prepared, for example, by the reaction of vinyl-, allyl-, or butenyl chloride with $HSi(X)_3$, using chloroplatinic acid as the catalyst, or by the same reaction with $HSiCl_3$ followed by alkoxylation or acyloxylation of the chlorosilane adduct. The reactants of the formula $ClCH_2Si(X)_3$ can be prepared by the chlorination of $MeSiCl_3$ to produce $ClCH_2SiCl_3$, followed by alkoxylation or acyloxylation of the latter.

In the preparation of aqueous solutions from the organosilanes of this invention, the hydrolysis water is best employed at a pH of from 3 to 7 inclusive. At a pH of 7, however, a rather long time is required to reach the water soluble hydrolyzate stage, thus a pH of from 3.5 to 5 is preferred. Once the water soluble state is reached, it is immaterial whether any water used for further dilution is on the acid side. Preferably the hydrolysis water is made mildly acidic with a water soluble carboxylic acid such as acetic or propanoic acids. This aids in the hydrolysis of the (OR') groups, but does not bring about the more rapid and more complete condensation of silanol groups which will take place if a base or a stronger acid is used to expedite the hydrolysis. Such condensation is to be avoided because the resulting siloxanes and siloxanols will gel and precipitate out of the aqueous solution, i.e., the "shelf life" of the solution will be poor. In general, the best results are obtained by mixing the defined organosilanes with water which contains about 0.1 percent by weight of acetic acid. If desired, water miscible solvents can be added to the aqueous solution to improve its shelf life and wetting characteristics. The acetoxysilanes of this invention will, of course, provide their own acid upon contact with water.

In case one uses halosilanes or other silanes producing strong acids upon hydrolysis, it is necessary to buffer the hydrolysis solution to prevent gelation of the hydrolyzate. This is best done by adding a dilute solution of the silane in a water soluble solvents such as acetone, to dilute aqueous ammonia.

It should be understood that the compositions of this invention are useful in other applications than those mentioned above, for example, they can be used to modify conventional vinylic resins for use as electrical varnishes or the hydrolyzates of the silanes can be used per se as laminating resins. The silanes of this invention are also very useful as additives to concrete for imparting freeze-thaw durability to the concrete.

The following examples are illustrative only. The symbols Me, Et, i-Pr, Bu and Ac have been used to represent methyl, ethyl, isopropyl, butyl and acetyl radicals respectively. All parts and percentages mentioned are by weight.

*Example 1*

A mixture of 1,000 ml. toluene, 12 g. 2,5-ditertiarybutyl hydroquinone, 61 g. (0.5 mole) $HSi(OMe)_3$, and 10 g. of a solution of $H_2PtCl_6 \cdot 6H_2O$ in methylbenzoate (said solution containing 1 percent by weight Pt) was heated to 105° C. and a mixture of 427 g. (3.5 moles) $HSi(OMe)_3$ and 504 g. (4 moles) allylmethacrylate was added thereto over a period of about 1.5 hours. The exothermic reaction taking place during this addition maintained the temperature at about 105° C. The reaction mass was heated for 1 hour at 110° to 112° C., cooled, and 10 g. hydroquinone and 5 g. 2,5-ditertiarybutyl hydroquinone added thereto. Volatiles were stripped off and the residue was distilled through a 12 inch Vigreaux column. The desired product $CH_2=C(Me)COO(CH_2)_3Si(OMe)_3$ was distilled off at 100° to 110° C. at 5 mm. Hg pressure. Redistillation of the product cuts through the Vigreaux column showed a boiling range of 94° to 96° C. at 1 mm. Hg, $n_D^{25}$ 1.4305.

Example 2

A mixture of 200 ml. toluene, 0.5 g. 2,5-ditertiarybutyl hydroquinone, 12.2 g. $HSi(OMe)_3$, and 0.6 g. of the $H_2PtCl_6 \cdot 6H_2O$ solution of Example 1 was heated to 110° C. and a mixture of 122 g. (1 mole) $HSi(OMe)_3$ and 112 g. (1 mole) allylacrylate was added thereto over a period of about 2 hours, the temperature being thus maintained at 110° to 114° C. After the addition was complete, the reaction mass was heated one hour at 106° to 114° C., cooled, and 0.5 g. 2,5-ditertiary butyl hydroquinone added thereto. After stripping off volatiles, the residue was distilled through the 12 inch Vigreaux column to give the product $CH_2=CHCOO-(CH_2)_3Si(OMe)_3$, boiling at 65° to 70° C. at 0.1 mm. Hg pressure, $n_D^{25}$ 1.4155.

Example 3

When the compounds $HSi(OEt)_3$, $HSi(Oi-Pr)_3$, $HSi(OAc)_3$, $HSi(OCH_2CH_2OBu)_3$, or $$HSi(OCH_2CH_2OMe)_3$$

are substituted for $HSi(OMe)_3$ in the reactions of Examples 1 and 2, the products obtained correspond to those of said examples with (OEt) groups etc. attached to the silicon atom in place of the (OMe) groups.

Example 4

When vinylmethacrylate is used in place of allylmethacrylate in the process of Example 1, the compound $CH_2=C(Me)COO(CH_2)_2Si(OMe)_3$ is produced.

Example 5

$MeSiCl_3$ was chlorinated to produce $ClCH_2SiCl_3$. The latter was reacted with methanol to produce $$ClCH_2Si(OMe)_3$$

When a solution of 1 mol triethylamine, 1 mole methacrylic acid, 15 parts hydroquinone, 300 parts xylene, and 0.9 mole $ClCH_2Si(OMe)_3$ is heated at reflux for 16 hours, filtration and distillation of the reaction mass yields the product $CH_2=C(Me)COOCH_2Si(OMe)_3$.

Example 6

A mixture of 1 part $CH_2=CHCOO(CH_2)_3Si(OMe)_3$ and 20 parts 0.1 percent acetic acid in aqueous solution was agitated slightly to form an homogeneous solution of the resulting hydrolyzate, then 179 parts water was added to form a 0.5 percent solution based on the original organosilane. Glass cloth having the commercial designation "112" (i.e., "181" style glass cloth which had been heat-cleaned) was dipped in the 0.5 percent solution. The glass cloth picked up about 65 percent of its weight of the solution, representing a pick-up of about 0.23 percent calculated as $CH_2=CHCOO(CH_2)_3SiO_{1.5}$. The cloth was allowed to dry at room temperature, and was then heated 7 minutes at 230° F.

A laminate was prepared containing 14 plies of the treated glass cloth (laid up with the warp threads rotated 90° in alternate plies) impregnated with a polyester resin, the laminate being cured 30 minutes at 30 p.s.i. and 100° C. to form a molded sheet having a thickness of about 120 mils and containing about 30 percent by weight of the cured polyester resin. The resin employed was a solution of 70 parts linear polyester in 30 parts of styrene monomer, to which had been added 0.5 part benzoyl peroxide dissolved in about 7.5 parts styrene monomer. The linear polyester in this resin mixture was one prepared from phthalic acid and maleic acid in equimolar proportions reacted with propylene glycol, the 70 percent solution of this polyester in styrene having an acid number of about 35. The flexural strength of this laminate was determined in accordance with the U.S. Federal Specification L–P 406b–Method 1031, and compressive strength was determined in accordance with Method 1021 of that specification. Flexural strength was also determined on a sample of the laminate which had been boiled in water for 2 hours and then wiped dry, this being a test which is recognized as roughly the equivalent of standing in water at room temperature for one month. Results from the latter test will be referred to hereafter as the "2 Hr. Boil" data. The 2 hr. boil flexural strength times 100 divided by the strength of the laminate as molded is the "Percent Retention." The following results were obtained on the laminate prepared above, the strengths being reported in p.s.i.

| | |
|---|---|
| Flexural strength | 82,400 |
| 2 hr. boil | 76,200 |
| Percent retention | 93 |
| Compressive strength | 44,900 |

For purposes of comparison, a laminate was prepared in the same way from the same polyester resin but the glass cloth employed was not treated with the organosilane. The test results were as follows:

| | |
|---|---|
| Flexural strength | 50,700 |
| 2 hr. boil | 32,600 |
| Percent retention | 64 |
| Compressive strength | 29,600 |

Example 7

A mixture of 1 part $$CH_2=C(Me)COO(CH_2)_3Si(OMe)_3$$

and 20 parts 0.1 percent acetic acid solution was agitated until homogeneous, then diluted with 179 parts additional 0.1 percent acetic acid. A sample of "112" heat-cleaned glass cloth was dipped in the solution, air-dried, and heated 7 minutes at 230° F. The treated glass cloth contained about 0.24 percent of its own weight of the organosilicon coating, calculated as $$CH_2=C(Me)COO(CH_2)_3SiO_{1.5}$$

Different laminates were prepared from this treated cloth, as follows:

(A) A laminate was prepared by the same technique and from the same benzoyl peroxide catalyzed polyester resin system as in Example 6. Test data showed the following results.

| | |
|---|---|
| Flexural strength | 84,000 |
| 2 hr. boil | 85,200 |
| Percent retention | 102 |
| Compressive strength | 53,300 |

The increase in strength after boiling the laminate for 2 hours indicates that the laminate as molded was not quite fully cured, and further curing took place during the boiling which more than offset any slight decrease in strength which may have been brought about by exposure to the water.

(B) A laminate was prepared by impregnating 14 alternated plies of the treated glass cloth with the polyester resin described in Example 6. In place of the benzoyl peroxide catalyst, however, a system which would cure at room temperature was produced by adding to the resin a double catalyst consisting of sufficient cobalt octoate to provide 0.03 percent Co in the resin, and 0.5 percent methylethyl ketone peroxide. The impregnated glass cloth was molded at room temperature for 24 hours under an initial pressure of 30 p.s.i., with stops set in the mold. The final laminate had a thickness of 123 mils. The laminate so produced was removed from the mold, given an after-cure in an oven at 140° F. for 6 hours, and tested with the following results.

Flexural strength _____ 96,000
2 hr. boil _____ 86,300
Percent retention _____ 90
Compressive strength _____ 65,000

(C) Another room temperature cured laminate was prepared by impregnating 14 alternated plies of the treated glass cloth with a polyester resin consisting of 75 percent of the linear polyester described in Example 6 and 25 percent methylmethacrylate. This resin contained 0.25 percent methylethyl ketone peroxide and 0.007 percent Co added as cobalt octoate. The impregnated assembly was molded 24 hours at room temperature as before, and then after-cured for 12 hours at 140° F. The laminate was 120 mils thick and had the following properties.

Flexural strength _____ 97,100
2 hr. boil _____ 85,500
Percent retention _____ 88
Compressive strength _____ 61,400

(D) A solid, powdered linear polyester which is the fumaric acid ester of an alkylene oxide and bisphenol A (i.e., p,p'-isopropylidenediphenol) is marketed by the Atlas Powder Company as "Atlac 382." A solution was prepared containing 385 parts "Atlac 382" in 315 parts of styrene monomer. This solution was catalyzed with 1 percent benzoyl peroxide and used to impregnate 14 alternated plies of the treated glass cloth, which were then press molded as in Example 6. The resulting laminate was 105 mils thick and had the following properties.

Flexural strength _____ 100,000
2 hr. boil _____ 95,600
Percent retention _____ 95.6
Compressive strength _____ 43,700

For purposes of comparison, another laminate was prepared in the same way from the same resin, using glass cloth which had not been treated with the organosilicon compound, and this laminate had the following properties.

Flexural strength _____ 15,200
2 hr boil _____ 14,400
Compressive strength _____ 11,200

(E) A solution was prepared of 66.5 parts of a resinous copolymer having a viscosity of about 3300 poises at 77° F. and being the reaction product of 4 moles butadiene and 1 mole styrene, in 66.5 parts of vinyl toluene, and 3.65 parts dicumyl peroxide and 3.65 parts di-t-butyl peroxide were added thereto. A laminate was prepared by impregnating 14 alternated plies of the treated glass cloth with this solution, and molding the assembly for 40 minutes at 175° C. and 30 p.s.i.

This laminate had the following properties.

Flexural strength _____ 49,300
2 hr. boil _____ 47,400
Percent retention _____ 96
Compressive strength _____ 21,000

For purposes of comparison, another laminate was prepared in the same manner but using glass cloth which had not been treated with the organosilicon compound. The test results were as follows.

Flexural strength _____ 12,600
2 hr. boil _____ 7,200

(F) A solution of 60 parts of a resinous copolymer having a viscosity of 4600 poises at 77° F. and being a copolymer of butadiene and styrene in a 4:1 molar ratio, 40 parts vinyltoluene, 2 parts dicumyl peroxide, and 2 parts di-t-butyl peroxide was used to impregnate 14 alternated plies of the treated glass cloth. The assembly was molded at 30 p.s.i. for 30 minutes at 300° F. and 30 minutes at 320° F., then removed from the press and post-cured 2 hours at 350° F. This laminate had a thickness of 130 mils and had the following properties.

Flexural strength _____ 54,600
2 hr. boil _____ 55,200
Compressive strength _____ 30,000

A laminate prepared in the same way from the same resin, but using untreated glass cloth, had a flexural strength of only 26,800; 2 hr. boil strength of 10,200; and a compressive strength of 9,600.

*Example 8*

When $CH_2=C(Me)COO(CH_2)_3Si(O-Pr)_3$ or the corresponding $—Si(OAc)_3$ and $—Si(OCH_2CH_2OMe)_3$ compounds or $CH_2=C(Me)COOCH_2Si(OMe)_3$ or $$CH_2=CHCOO(CH_2)_4Si(OEt)_3$$

are used in place of the $—Si(OMe)_3$ compound in the treatment described in Example 7, and laminates then prepared as described in that example, comparable improvements in the strength of the laminates are obtained.

Laminates have been shown in the above examples because they illustrate so well the improvement in bond strength between a siliceous material and a polymerizable unsaturated material which can be brought about by the silanes of this invention. It will be obvious that the improvement in bond strength will be equally important in many other usages, as, for example, in treating sheets of glass which will be used in sandwich structures such as safety glass; in treating glass, ceramics, vitreous enamel surfaces and the like which are to be given protective or decorative coatings of paints, enamels, or varnishes containing unsaturated resins, in treating glass fiber textiles which are to be colored by pigments dispersed in unsaturated resins such as the acrylic latex pigment bonding systems conventionally used for that purpose; in treating silica, titania, alumina, iron oxide, and other metal oxide fillers, as well as mica, asbestos, chopped glass, etc. to improve the reinforcement effect of such fillers in unsaturated resinous or rubbery articles; and in the treatment of metal surfaces such as steel, iron, and aluminum to improve the adhesion of protective and decorative coatings or of bodies of unsaturated resins and rubbers thereto. The treatment of steel and aluminum with the aqueous solutions of hydrolyzates described in Examples 6 and 7 has been found to provide a surface against which silicone rubber (such as that containing dimethylsiloxane and methylvinylsiloxane copolymer units) can be vulcanized to produce a bond to the metal which is stronger than the silicone rubber itself.

*Example 9*

One mole of allylmethacrylate containing 1 percent by weight hydroquinone was mixed with 100 p.p.m. platinum added as chloroplatinic acid and the mixture was heated to 70° to 80° C. as one mole of trichlorosilane was added. The product was heated one hour longer at 80° C. then distilled to give $CH_2=C(Me)COO(CH_2)_3SiCl_3$ boiling at 100° C. at 1 mm. and having a density at 25° C. of 1.238.

This material was applied to 181 glass cloth and washed and dried to give a weight pickup of .25 percent by weight of the glass. The primed glass cloth was laminated with the polyester resin as described in Example 6 and the cured laminate had the following properties:

Flexural strength _____ 86,800
2 hr. boil _____ 82,500
Percent retention _____ 95
Compressive strength _____ 53,700

Example 10

A mixture of 150 ml. of benzene, .15 mole of $$CH_2=C(Me)COO(CH_2)_3SiCl_3$$

and .45 mole of alpha-picoline was cooled to 0° C. There was added thereto a solution of .6 mole of acetoxime in 200 ml. of benzene. The mixture was held at 5° to 10° C. for one hour and then heated to 55° to 60° C. The product was cooled and filtered free of alpha-picoline hydrochloride. The solvent was then removed from the filtrate to give the liquid compound $$CH=C(Me)COO(CH_2)_3Si[ON=CMe]_3$$

This product was dissolved in water to give a .6 percent by weight solution based on the weight of the corresponding siloxane and the solution was then used to impregnate 181 glass cloth and the resulting product laminated with the polyester resin as described in Example 6. The cured laminates had the following properties:

Flexural strength _____ 86,300
2 hr. boil _____ 79,175
Percent retention _____ 92
Compressive strength _____ 47,700

Example 11

100 g. of methylmethacrylate and 125 g. of beta-(allyloxy)ethanol were dissolved in 140 g. of toluene and mixed with .5 g. of hydroquinone and 2 g. of concentrated sulfuric acid. The mixture was refluxed for 6 hours as methanol was removed. The resulting ester was washed, dried, and distilled.

66 g. of the ester was mixed with 61 g. of trimethoxysilane, 73 g. of tetrahydrofuran, 1 g. of phenyl-beta-naphthyl amine, .5 g. of hydroquinone and .10 g. of a 1 percent solution of chloroplatinic acid in alcohol. The mixture was warmed to 65° to 75° C. for two hours and then distilled to give the product $$CH_2=C(Me)COOCH_2CH_2O(CH_2)_3Si(OMe)_3$$

having the following properties: B.P. 150° to 155° C. at 3 mm., $d_4^{25}$ of 1.057 and $n_D^{25}$ 1.4365.

The product was dissolved in water as shown in Example 6, and applied to 181 glass cloth as shown in that example. The resulting cloth was laminated with the polyester resin as shown in Example 6 and the cured laminates had the following properties:

Flexural strength _____ 97,600
2 hr. boil _____ 97,000
Percent retention _____ 99
Compressive strength _____ 54,600

Example 12

13 g. of beta-hydroxyethylmethacrylate was dissolved in 13 g. of ethyleneglycoldimethylether. .01 g. of hydroquinone and 10 drops of stannic chloride were added thereto and then 23.6 g. of

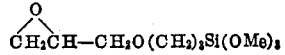

was added as the mixture was cooled on a water bath held at 20° C. The mixture was then allowed to stand for one hour and the product was a water soluble fluid having the formula $$CH_2=C(Me)COOCH_2CH_2OCH_2\overset{OH}{\underset{|}{C}}HCH_2O(CH_2)_3Si(OMe)_3$$

This material was applied to 181 glass cloth and laminated as shown in Example 6 and the resulting cured laminates had the following properties:

Flexural strength _____ 84,200
2 hr. boil _____ 77,000
Percent retention _____ 91
Compressive strength _____ 44,500

Example 13

The procedure of Example 12 was repeated except that 14.4 g. of beta-hydroxypropylmethacrylate was employed. The resulting product was a water soluble material having the formula $$CH_2=C(Me)COOCH_2CH(Me)O CH_2\overset{OH}{\underset{|}{C}}HCH_2O(CH_2)_3Si(OMe)_3$$

This product was applied to glass and laminated in accordance with the procedure of Example 6 to give the following properties for the cured laminates.

Flexural strength _____ 84,600
2 hr. boil _____ 81,200
Percent retention _____ 96
Compressive strength _____ 49,300

Example 14

When the following acrylic esters are reacted with the following silanes in the presence of 100 p.p.m. platinum added as Pt on alumina the following products are obtained:

| Ester | Silane | Product |
| --- | --- | --- |
| $CH_2=C(Me)COO(CH_2CH_2O)_{100}CH_2CH=CH_2$ | $HSi(NMe_2)_3$ | $CH_2=C(Me)COO(CH_2CH_2O)_{100}(CH_2)_3Si(NMe_2)_3$ |
| $CH_2=CHCOO[(C_2H_4O)_{25}(C_3H_6O)_{10}]CH_2CH=CH_2$ | $HSi(OCH_2CH_2Cl)_3$ | $CH_2=CHCOO[(C_2H_4O)_{25}(C_3H_6O)_{10}](CH_2)_3Si(OCH_2CH_2Cl)_3$ |
| $CH_2=C(Me)COOCH_2C(Me)=CH_2$ | $HSi(OOC-\langle\phantom{x}\rangle)_3$ | $CH_2=C(Me)COOCH_2CH(Me)CH_2Si(OOC-\langle\phantom{x}\rangle)_3$ |
| $CH_2=C(Me)COOCH_2C(Me)=CH_2$ | $HSi(OEt)_3$ | $CH_2=C(Me)COOCH_2CH(Me)CH_2Si(OEt)_3$ |

Example 15

When the ester $CH_2=C(Me)COO(CH_2CH_2O)_{100}H$ is reacted with the silane

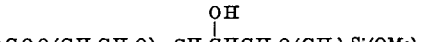

in accordance with the procedure of Example 12, the product $$CH_2=C(Me)COO(CH_2CH_2O)_{100}CH_2\overset{OH}{\underset{|}{C}}HCH_2O(CH_2)_3Si(OMe)_3$$

is obtained.

Example 16

This example further illustrates the unique and unexpected properties of the compounds of this invention which results from the trifunctional silicon atom.

Specifically, this example shows that the compounds of this invention impart unexpectedly superior freeze-thaw durability to concrete. For purposes of comparison there was included two silanes which were identical to the compounds of this invention that were used except that they had a difunctional silicon atom at one end, i.e., one of the hydrolyzable groups had been replaced by a methyl group.

The concrete employed contained 27.5 pounds of Portland cement, 87 pounds of coarse traprock aggregate, 60.5 pounds of sand (¼″ particle size and smaller) and about 13.2 pounds of water. The silanes were employed at 0.3% by weight based on the weight of the Portland cement in the concrete.

The concrete was prepared by dry mixing the cement, aggregate and sand for two minutes. Then water was added and mixing continued for five minutes. The methoxysilanes were put in the water and added in this manner. The chlorosilanes were added after the water had been added.

The freeze-thaw durability of the samples was tested employing ASTM testing procedure C–290–57T except that curing was done at 100% relative humidity instead of in lime water and a 10% sodium chloride solution was used instead of fresh water. The test involved immersing 3″ x 4″ x 16″ bars of the concrete (in stainless steel containers) in a Conrad machine that froze and thawed the test bars in four hour cycles. The test bars were weighed initially, and the weight loss was measured as the test progressed. The number of cycles that it took for a 5% weight loss to occur is reported as the durability. The durability reported is the average number of cycles from three bars run. At a 5% weight loss the test bar is considered to have failed. The results are given in the following table.

| Additive: | Cycles in 10% NaCl |
|---|---|
| $CH_2=C(CH_3)COO(CH_2)_3Si(OCH_3)_3$ | 380 |
| $CH_2=C(CH_3)COO(CH_2)_3\overset{CH_3}{\underset{|}{Si}}(OCH_3)_2$* | 65 |
| $CH_2=C(CH_3)COO(CH_2)_3SiCl_3$ | 164 |
| $CH_2=C(CH_3)COO(CH_2)_3\overset{CH_3}{\underset{|}{Si}}Cl_2$* | 52 |

*Included for purposes of comparison.

That which is claimed is:
1. An organosilane of the formula

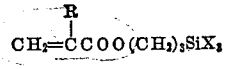

in which R is selected from the group consisting of H and the methyl radical and X is a hydrolyzable group.

2. An organosilane of the formula

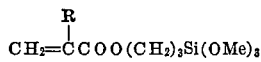

in which R is selected from the group consisting of H and the methyl radical and Me represents a methyl radical.

3. An organosilane of the formula $$CH_2=C(Me)COO(CH_2)_3SiCl_3$$

where Me represents a methyl radical.

4. An organosilane of the formula $$CH_2=CHCOO(CH_2)_3Si(OMe)_3$$

where Me represents a methyl radical.

5. An organosilane of the formula $$CH_2=C(Me)COO(CH_2)_3Si(OMe)_3$$

where Me represents a methyl radical.

6. A composition of matter comprising an aqueous solution of an hydrolyzate of the organosilane of claim 1.
7. A composition of matter comprising an aqueous solution of an hydrolyzate of the organosilane of claim 2.
8. A composition of matter comprising an aqueous solution of an hydrolyzate of the organosilane of claim 3.
9. A composition of matter comprising an aqueous solution of an hydrolyzate of the organosilane of claim 4.
10. A composition of matter comprising an aqueous solution of an hydrolyzate of the organosilane of claim 5.

References Cited by the Examiner
UNITED STATES PATENTS

| | | | |
|---|---|---|---|
| 2,793,223 | 5/1957 | Merker | 260—448.2 |
| 2,823,218 | 2/1958 | Speier et al. | 260—448.2 |
| 2,891,885 | 6/1959 | Brooks | 117—126 |
| 2,922,806 | 1/1960 | Merker | 260—448.8 |

FOREIGN PATENTS 602,440  7/1960  Canada.

OTHER REFERENCES

Andrianov et al., Doklady Akad. Nauk. S.S.S.R. (1958). (Chem. Abs., 52, p. 19912 1958.)

Andrianov et al., Bull. Acad. Sci. of USSR, Div. of Chem., 1957, pp. 467–472.

TOBIAS E. LEVOW, *Primary Examiner.*

E. C. BARTLETT, J. G. LEVITT, *Examiners.*

UNITED STATES PATENT OFFICE
CERTIFICATE OF CORRECTION

Patent No. 3,258,477                      June 28, 1966

Edwin P. Plueddemann et al.

It is hereby certified that error appears in the above numbered patent requiring correction and that the said Letters Patent should read as corrected below.

Column 1, lines 65 to 75, the left-hand portion of the formula should appear as shown below instead of as in the patent:

column 2, lines 13 to 15, the formula should appear as shown below instead of as in the patent:

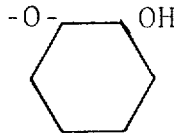

line 17, for "acryloxy" read -- acyloxy --; column 8, line 18, the formula should appear as shown below instead of as in the patent:

column 9, line 13, the formula should appear as shown below instead of as in the patent:

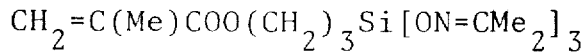

Signed and sealed this 26th day of September 1967.

(SEAL)
Attest:

ERNEST W. SWIDER                      EDWARD J. BRENNER
Attesting Officer                 Commissioner of Patents